(12) United States Patent
Klaus et al.

(10) Patent No.: US 7,493,768 B2
(45) Date of Patent: Feb. 24, 2009

(54) METHOD FOR INCREASING THE EFFICIENCY OF A GAS TURBINE SYSTEM AND GAS TURBINE SYSTEM SUITABLE THEREFOR

(75) Inventors: Roland Klaus, Dormitz (DE); Jörg Lengert, Lonnerstadt (DE); Kathrin Ruhsland, Adelsdorf (DE)

(73) Assignee: Siemens Aktiengesellschaft, Munich (DE)

( * ) Notice: Subject to any disclaimer, the term of this patent is extended or adjusted under 35 U.S.C. 154(b) by 446 days.

(21) Appl. No.: 10/566,780

(22) PCT Filed: Jul. 6, 2004

(86) PCT No.: PCT/EP2004/007385

§ 371 (c)(1),
(2), (4) Date: Jan. 31, 2006

(87) PCT Pub. No.: WO2005/019606

PCT Pub. Date: Mar. 3, 2005

(65) Prior Publication Data

US 2007/0051108 A1 Mar. 8, 2007

(30) Foreign Application Priority Data

Jul. 31, 2003 (DE) ................. 103 35 143

(51) Int. Cl.
*F02C 1/00* (2006.01)
*F02C 6/10* (2006.01)
*F01K 25/06* (2006.01)

(52) U.S. Cl. ................. 60/772; 60/39.181; 60/39.182; 60/649

(58) Field of Classification Search ............ 60/772, 60/39.181, 39.182, 649
See application file for complete search history.

(56) References Cited

U.S. PATENT DOCUMENTS

| 4,819,437 | A | * | 4/1989 | Dayan | 60/649 |
| 5,572,871 | A | * | 11/1996 | Kalina | 60/649 |
| 5,715,682 | A | * | 2/1998 | Nakata | 60/649 |
| 5,842,345 | A | * | 12/1998 | Scharpf | 60/649 |
| 6,173,563 | B1 | * | 1/2001 | Vakil et al. | 60/39.182 |

(Continued)

FOREIGN PATENT DOCUMENTS

EP 0 472 020 A1 2/1992

(Continued)

OTHER PUBLICATIONS

Von W. Gajewski, A. Lezuo, R. Nürnberg, B. Rukes and H. Vesper, "Der Kalina-Prozeß", VGB Kraftwerkstechnik, Essen, Germany, vol. 69, No. 5, May 1, 1989, pp. 477-483, XP000028691.

(Continued)

*Primary Examiner*—Ted Kim

(57) ABSTRACT

The aim of the invention is to increase the efficiency of a gas turbine system. Said aim is achieved by transferring at least one portion of the heat of the waste gases of a gas turbine to a working medium of a thermodynamic circulation process, which comprises at least two substances featuring non-isothermal evaporation and condensation. Said circulation process allows the residual heat of the waste gases to be used for additionally generating electrical or mechanical power, especially at waste gas temperatures ranging from 100 to 200° C. Even previously existing systems can be retrofitted in a simple manner with such a circulation process.

5 Claims, 3 Drawing Sheets

U.S. PATENT DOCUMENTS 6,216,436 B1    4/2001    Ranasinghe et al.
2002/0053196 A1    5/2002    Lerner et al.

FOREIGN PATENT DOCUMENTS

EP    0 898 641 B1    3/1999
EP    0 949 406 A2    10/1999
EP    0 952 316 A2    10/1999

OTHER PUBLICATIONS

Silke Köhler and Ali Saadat, "Möglichkeiten und Perspektiven der geothermischen Stromerzeugung", Geothermische Technologieentwickllung—geologische und energietechnissche Ansatpunkte, STROO/23, 2000, pp. 7-28.

* cited by examiner

METHOD FOR INCREASING THE EFFICIENCY OF A GAS TURBINE SYSTEM AND GAS TURBINE SYSTEM SUITABLE THEREFOR

CROSS REFERENCE TO RELATED APPLICATIONS

This application is the US National Stage of International Application No. PCT/EP2004/007385, filed Jul. 06, 2004 and claims the benefit thereof. The International Application claims the benefits of German Patent application No. 10335143.4 filed Jul. 31, 2003. All of the applications are incorporated by reference herein in their entirety.

FIELD OF THE INVENTION

The invention relates to a method for increasing the efficiency of a gas turbine system in accordance with the claims as well as to a gas turbine system suitable therefor in accordance with the claims.

BACKGROUND OF THE INVENTION

As a result of intensive development work in recent years higher levels of efficiency, i.e. the ratio of electrical or mechanical power able to be generated in relation to the fuels used of around 40%, can be achieved with gas turbines. Combined cycle gas turbine (CCGT) systems, as are known for example from EP 0898 641 A1, make it possible to go beyond this and achieve efficiencies of over 55%. Despite this there is still a need to further increase the efficiency of such systems.

This applies in particular to gas turbine systems constructed in the past without steam generation as well as to CCGT systems which have been constructed in the low, medium and high power ranges. Some of these CCGT systems will be or have been provided with a remote heat decoupling for improving the fuel utilization. Despite this these older systems exhibit significantly lower levels of efficiency than modern gas turbine systems. Because of enormous cost pressure the operators of old systems with lower levels of efficiency are therefore forced to improve the cost effectiveness of their systems.

The operators of gas turbine systems without steam generation are therefore expanding their process or their system in some cases with a steam generation component. The additional generation of electrical or mechanical energy that this makes possible means that they obtain a better yield from the fuels used and thereby an improvement in the efficiency of the system. It is however desirable for operators of such old systems to improve the efficiency of their gas turbine systems even more. In particular such an improvement in efficiency should also be able to be implemented in existing gas turbine systems or CCGT systems.

SUMMARY OF THE INVENTION

The object of the present invention is therefore to specify a method for increasing the efficiency of a gas turbine system as well as a gas turbine system suitable therefor which make it possible to improve the efficiency of the system, whereby it is to be possible to increase the efficiency of existing systems at low expense, especially without intervening in a major way into the existing system.

The object to which the method is directed is successfully achieved by a method claimed in the claims. Advantageous embodiments of the method are the object of the subclaims.

The object directed to the gas turbine system is successfully achieved in accordance with the invention by a gas turbine system as claimed in the claims. Advantageous embodiments of the gas turbine system are the object of the subclaims.

The invention is based on the knowledge that many gas turbines or CCGT systems emit waste gases (e.g. flue gases) with temperatures in excess of 100° C. This means that these systems do not use the residual heat contained in the waste gases which can still be exploited. The result is high waste gas heat losses and thereby high operating costs. Many CCGT systems in particular are operated with waste gas temperatures of 120° C. to 150° C., since lower waste gas temperatures can only be implemented at great expense.

An improvement in the efficiency of the gas turbine system is thereby possible by re-using at least part of the heat of the waste gas of a gas turbine. This is made possible by the heat of the waste gas being transferred to a working medium featuring at least two substances of a thermodynamic circulation process with non-isothermal evaporation and condensation. With the aid of such a circulation process, mechanical or electrical power can be generated at high efficiency while reducing the waste gas temperature down to 50 to 70° C., which contributes to the improvement of the efficiency of the gas turbine system and thereby improves the cost effectiveness of the system.

An inventive turbine system therefore features at least one heat exchanger connected downstream from a gas turbine on the waste gas side which is connected into a device for carrying out a thermodynamic circulation process, with the device featuring a working medium with at least two substances with non-isothermal evaporation and condensation.

To improve the efficiency in existing systems it is thus only necessary to retrofit the at least one downstream heat exchanger and the device for carrying out the thermodynamic circulation process. This can be done for existing gas turbine systems within the framework of an expansion to a CCGT system for example. For existing gas turbine systems in combination with steam generation (i.e. afterburning of the gas turbine waste gases in a steam generator) and with CCGT systems with flue gas temperatures greater than 100° C., the residual heat of the waste gases can be used by simply retrofitting the device to execute the thermodynamic circulation process for generating electrical or mechanical power. Thus a higher electrical or mechanical output and thereby a higher efficiency of the gas turbine system is possible with the same volume of fuel. Furthermore this leads to a reduction of the $CO_2$ emissions for each kilowatt hour of electrical energy produced.

With gas turbine systems in combination with steam generation as well as with CCGT systems, increasing efficiency is possible without intervention in the main system since the at least one additional heat exchanger only has to be installed on the waste gas side, i.e. in the waste gas tract of the gas turbine system. The retrofitting of the at least one heat exchanger as well as the device for carrying out the thermodynamic circulation process is thus possible within the framework of a revision to the main system at low expense.

By using a working medium with at least two substances with non-isothermal evaporation and condensation, the concentration of the at least two materials on the one hand and slight adaptations to the pressure and the temperature of the working medium on the other hand can be used to tailor the thermodynamic circulation process in a simple manner to different gas turbine systems with different waste gas temperatures.

The device for carrying out the thermodynamic circulation process is therefore preferably embodied as a standardized unit which is suitable for use in the very widest variety of gas turbine systems and can therefore be designed at low cost.

A high efficiency and simultaneous ease of adaptation of the process or the device for carrying out the process to different waste gas temperatures can be made possible by using a Kalina cycle as the thermodynamic circulation process, such as is known for example from the article by Köhler, S. and Saadat, A. "Möglichkeiten und Perspektiven der geothermischen Stromerzeugung—geologische und energietechnische Ansatzpunkte" (Options and perspectives in geothermal technology development—geological and energy technology approaches); GeoForschungszentrum Potsdam, STR00/23, 2000, pp. 7-28. This circulation uses a two-substance mixture as its working medium, e.g. comprising ammonia and water, with water acting as the solvent.

In accordance with an embodiment of the invention especially suitable for waste gas temperatures of 140° C. to 200° C., the thermodynamic circulation process is carried out with a method which has at least the following steps:

Pumping a liquid flow of the working medium at an increased pressure;

Separating the pressurized liquid working medium flow into a first partial flow and a second partial flow Partial evaporation of the first partial flow using heat generated by cooling down of the waste gases;

Partial evaporation of the second partial flow (17) using heat generated by partial condensation of an expanded working medium flow;

Combination of the partially evaporated first and second partial flow into a partially evaporated working medium flow;

Creation of a gaseous working medium flow by complete evaporation, if necessary partial overheating, of the partially evaporated working medium flow using heat which is generated from the cooling down of the waste gases, Expansion of the gaseous working medium flow, conversion of its energy into a usable form and creation of the expanded working medium flow; and Condensation of the partially condensed, expanded working medium flow to form the liquid working medium flow.

The efficiency of the device and thus of the gas turbine system can in this case be further improved by the first partial flow and the liquid working medium flow having essentially the same temperature and thus allowing a best possible utilization of the heat of the waste gases for power generation.

A high efficiency of the thermodynamic circulation process, i.e. a good conversion of the heat contained in the waste gas into electrical or mechanical power, is especially possible if the waste gases of the gas turbine at the at least one heat exchanger have a temperature of 100 to 200° C., especially 140 to 200° C.

BRIEF DESCRIPTION OF THE DRAWINGS

The invention as well as a further advantageous embodiments of the invention in accordance with the features of the subclaims are explained in more detail below with reference to exemplary embodiments in the figures. The figures show FIG. 1 a schematic diagram of a CCGT system with a waste gas-side downstream heat exchanger for heat transmission to a device for carrying out a thermodynamic circulation process with a working medium with at least two substances with non-isothermal evaporation and condensation, FIG. 2 a simplified circuit of an advantageous device for carrying out the thermodynamic circulation process, FIG. 3 an example of an embodiment of the device for carrying out a thermodynamic circulation process as a standardized unit.

DETAILED DESCRIPTION OF THE INVENTION

Figure 1:
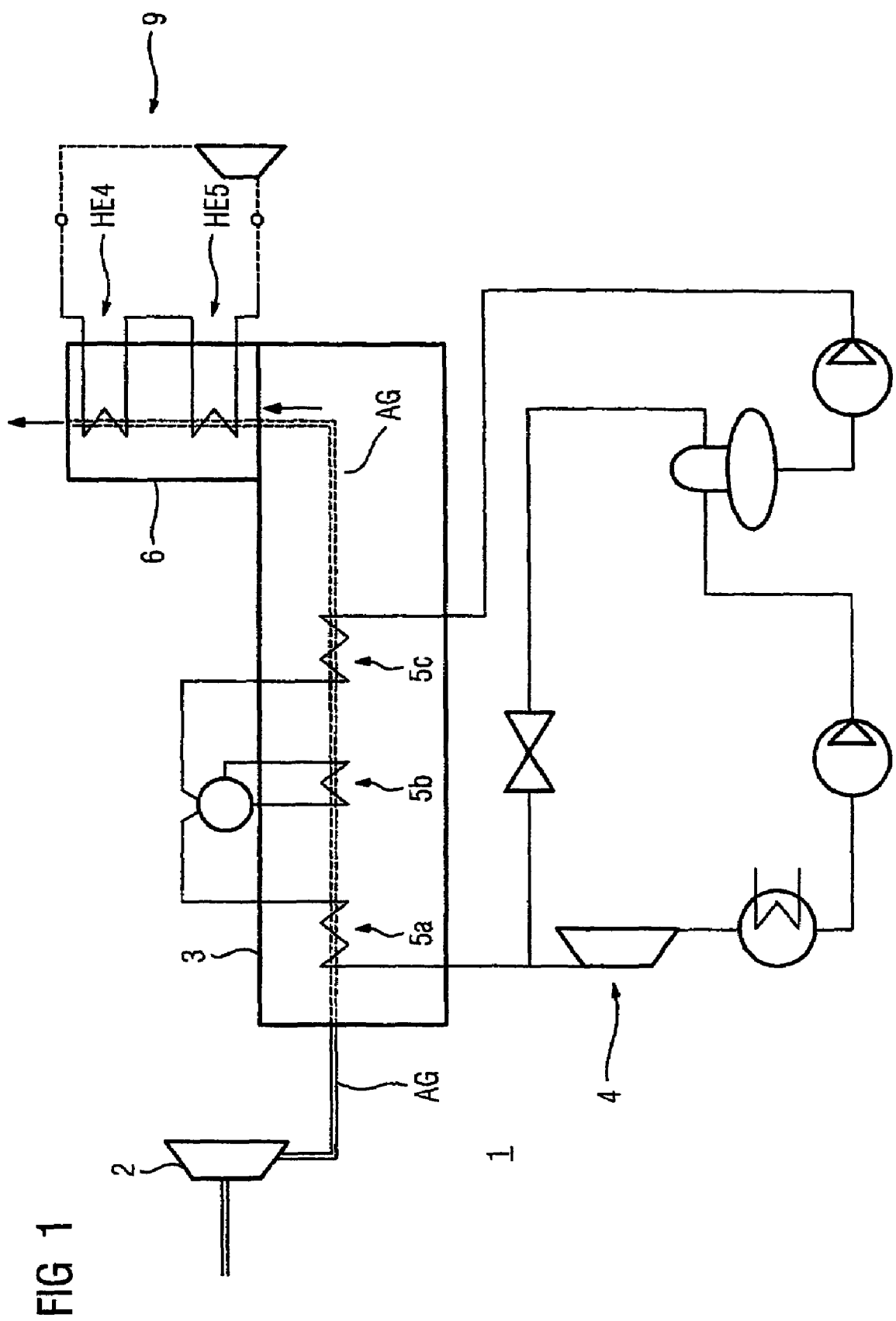

FIG. 1 shows a schematic diagram of a combined cycle gas and steam turbine system 1 with a gas turbine 2 and a waste heat vessel 3 through which the hot waste gases AG of the gas turbine 2 flow. The gas turbine is operated with an open gas turbine process.

In an outlet air chimney 6 of the combined cycle gas turbine system 1 are two heat exchangers HE4, HE5 for transmission of at least a part of the heat of the waste gases AG to a device 9 shown in simplified form for carrying out a thermodynamic circulation process with a working medium with at least two substances with non-isothermal evaporation and condensation. The thermodynamic circulation process involved is for example a Kalina cycle.

On the waste gas side three heat exchangers $5a$, $5b$, $5c$ of the water/steam circulation 4 of the combined cycle gas turbine system 1 are connected between the gas turbine and the heat exchangers HE4 and HE5. The heat exchangers $5a$, $5b$, $5c$ are arranged in the waste heat vessel 3 and transmit a part of the heat of the waste gas AG to the water/steam circulation 4.

With the aid of the device 9 the residual heat contained in the waste gases AG can be used for additional power generation and thereby the efficiency of the combined cycle system 1 increased. The pressure losses in the waste gases AG caused by the retrofitting of the device 9, which lead to power losses in the gas turbine 2 can be more than compensated for by the power gains from device 9.

An especially good heat transfer from the waste gases AG to the working medium of the device 9 is possible if the heat exchangers HE4, HE5 are embodied as shell and tube heat exchangers.

The arrangement of heat exchangers HE4 and HE5 in the outlet air chimney 6 enables these heat exchangers and the device 9 connected to them to be retrofitted without intervention into the main system, i.e. the gas turbine 2 including its associated components and the water/steam circulation 4. The temperature of the waste gases before of heat exchanger HE5 is preferably 100 to 200° C., especially 140 to 200° C. The cooling down of the waste gases AG by heat exchangers HE5 and HE4 reduces the temperature of the waste gases for example to 50 to 70° C. after heat exchanger HE4.

Figure 2:
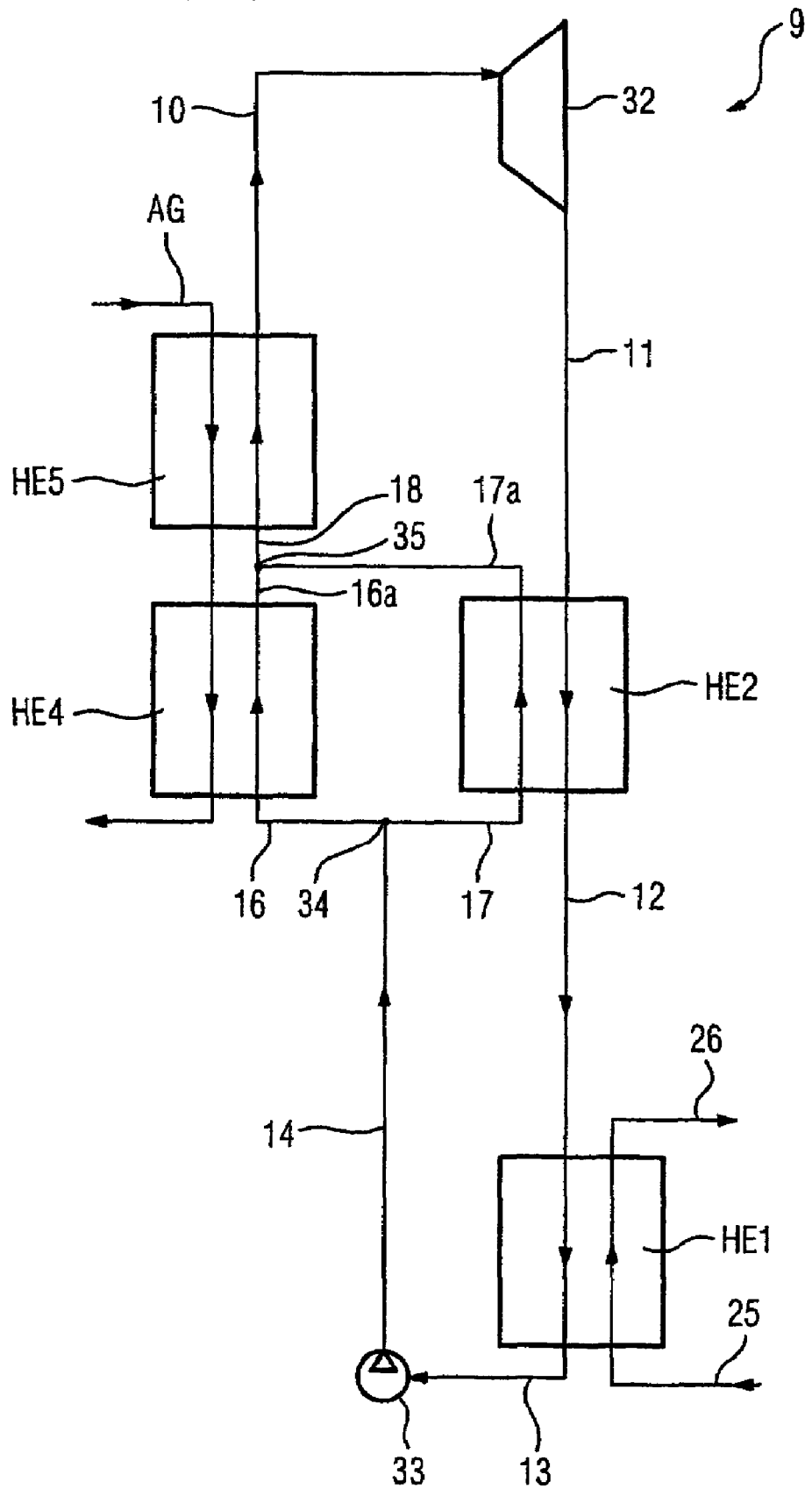

FIG. 2 shows a circuit of device 9 especially suited to waste gas temperatures of 140° C. to 200° C. for carrying out a thermodynamic circulation process in accordance with FIG. 1.

The device 9 features a heat exchanger HE5 through which the waste gases (flue gases ) AG of a gas turbine flow on the primary side and is connected on the secondary side to a mixer 35 on the one hand and to a turbine 32 on the other. The turbine 32 is connected on its output side to the secondary side of a heat exchanger HE2 which in its turn is connected to the primary side of a heat exchanger (condenser) HE1. The condenser HE1 is connected on its primary side output, where nec. via a condensate tank, via a pump 33 to a separator 34. The separator 34 is connected on the one hand via the primary side of the heat exchanger HE2 and on the other via the secondary side of the heat exchanger HE4 to the mixer 35.

The waste gases AG first flow through the primary side of heat exchanger HE5 and then through the primary side of heat exchanger HE5

A two-substance mixture comprising water and ammonia is used as the working medium in device 9. After the condenser HE1 the working medium is in a liquid state as a liquid working medium flow 13. With the aid of the pump 33 the liquid working medium flow 13 is pumped at an increased pressure and a pressurized liquid working medium flow 14 created, which is divided up by the separator 34 into a first partial flow 16 and a second partial flow 17.

The first partial flow 16 is accepted on the secondary side by the heat exchanger HE4 and using heat already created by the cooling down of the waste gases AG already cooled down in the heat exchanger HE5, is partially evaporated and creates a partially evaporated first partial flow 16a. The second partial flow 17 is accepted on the primary side by the heat exchanger HE2 and using heat generated by partial condensation of a expanded working medium flow 11 accepted on the secondary side, is partially evaporated and creates a partially evaporated second partial flow 17a. The partially evaporated first and second partial flows 16a, 17a are subsequently combined in the mixer 35 into one partially evaporated working medium flow 18. The heat exchangers HE2 and HE4 are in this case advantageously dimensioned so that the first and the second partially evaporated partial flow 16a or 17a have approximately the same temperature and the same steam content.

The partially evaporated working medium flow 18 is subsequently accepted on the secondary side by the heat exchanger HE5 and, through cooling down of the primary side waste gases AG, a completely evaporated, if necessary partially overheated gaseous working medium flow 10 is created. The gaseous working medium flow 10 will subsequently be expanded in the turbine 32, its energy converted into a usable form, e.g. into current via a generator not shown, and the expanded working medium flow 11 created. The expanded working medium flow 11 is partially condensed in the heat exchanger HE2 and a partially condensed, expanded working medium flow 12 created. The partly condensed, expanded working medium flow 12 is subsequently condensed in heat exchanger (condenser) HE1 with the aid of an incoming flow of cooling water 25 and the liquid working medium flow 13 created. The heat transmitted by the condensation of the expanded working medium flow 12 to the cooling water flow 25 is discharged by the outflowing cooling water flow 26.

The pressurized liquid partial flow 14 can be preheated via a further heat exchanger not shown through further partial condensation of the expanded working medium flow 12 already partly condensed in the heat exchanger HE2.

A especially good utilization of the heat from the waste gases and thereby an especially high efficiency of the circulation can however be achieved by dispensing with the preheating and thus by the first partial flow 16 essentially having the same temperature as the liquid working medium flow 13.

Figure 3:
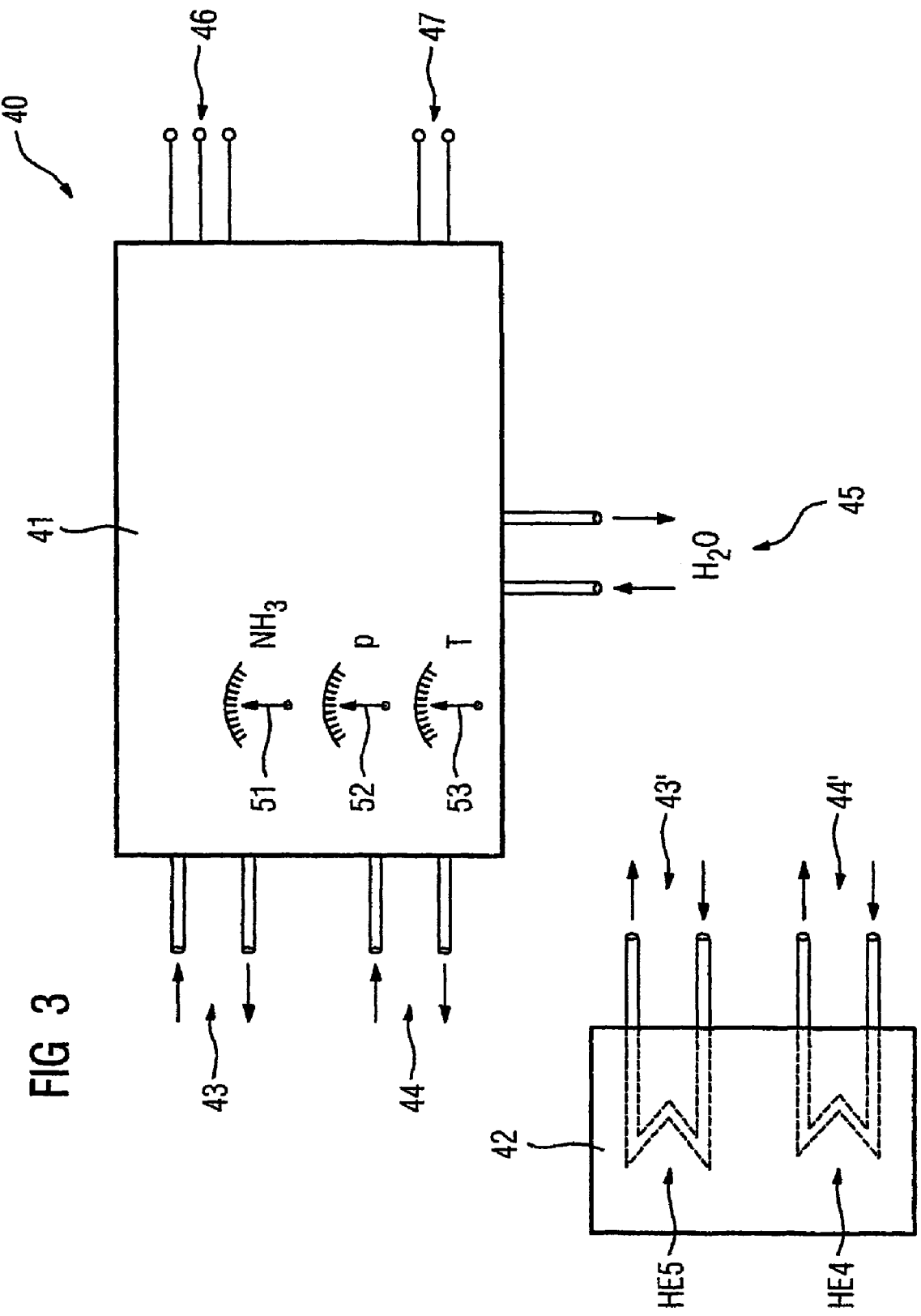

Device 9 is in this case, as shown in the simplified example in FIG. 3, preferably embodied as a standardized unit 40. The standardized unit 40 in this case comprises a circulation module 41 which includes all the components of the circulation with the exception of the heat exchangers HE4 and HE5. These components include the heat exchanger (condenser) HE1, the heat exchanger HE2 the turbine 32, the pump 33, a generator connected to the turbine and further devices necessary for the control, regulation and monitoring of the circulation.

The heat exchangers HE4 and HE5 are arranged in a heat exchanger module 42 which can be built into the outlet air chimney of a gas turbine system.

The circulation module 41 features pipework connection pairs 43 and 44 for connecting pipes to corresponding pipework connection pairs 43' and 44' at the heat exchanger module 42. Furthermore the circulation module 41 features pipework connections 45 for feeding in and removing cooling water to or from the heat exchanger (condenser) HE1. The power generated by the circulation module 41 can be tapped off by means of the electrical connections 46. The electrical connections 47 are used to route current for supplying power to the devices for control, regulation and monitoring of the circulation module and for supplying power to the pump 3. Such an external power supply is needed at least until such time as its own power needs can be met by the circulation module 41 itself. Alternatively its own needs can also be met by the circulation module 41 having a battery instead of an external power supply. A control element 51 can be used to set the concentration of the components of the working medium and control elements 52 and 53 to set the temperature or the pressure of the working medium in the circulation.

The circulation module 41 preferably has a container format, especially a 20' or 40' container format, and can thus be brought simply and rapidly by truck, train or ship to its deployment site, enabling the time and financial outlay involved in retrofitting the device 9 for carrying out the thermodynamic circulation process at an existing CCGT installation to be kept low.

The invention has been described above with reference to preferred exemplary embodiments, but can generally be seen as not being restricted to these exemplary embodiments. Instead there is the option of a plurality of variations and modifications of the invention or of these exemplary embodiments. For example the number of heat exchangers in the device 9 for carrying out the thermodynamic circulation process can be increased, additional valves and separators can be connected into the circuit. Furthermore the gaseous working medium flow 10 can be expanded in more than one step, e.g. via two turbines switched in series.

The invention claimed is:

1. A method for increasing the efficiency of a gas turbine system, comprising:
   transferring heat energy from a waste gas of a gas turbine to a water-steam flow of a steam turbine;
   further transferring additional heat energy from the waste gas to a working medium of a thermodynamic circulation process, the working medium comprising two materials with non-isothermal evaporation and condensation properties,
   wherein the thermodynamic circulation process is a Kalina cycle,
   wherein the thermodynamic circulation process comprises the following steps:
      pressurizing the liquid working medium flow;
      separating the pressurized liquid working medium flow into a first partial flow and a second partial flow;
      partially vaporizing the first partial flow by transferring heat energy from the waste gas to the first partial flow;
      partially vaporizing the second partial flow by transferring heat energy from a partially condensed and expanded working medium flow;
      combining the partially vaporized first and second partial flows into a partially vaporized working medium flow;

creating a gaseous working medium flow by vaporizing the partially vaporized working medium flow by transferring heat energy from the waste gas to the working medium flow;

converting the thermal energy of the gaseous working medium flow into a useful form by expansion of the gaseous working medium flow in a turbine;

further condensing the partially condensed, expanded working medium flow to form the liquid working medium flow.

2. The method as claimed in claim 1, wherein with the first partial flow and the liquid working medium flow have similar temperatures.

3. The method as claimed in claim 2, wherein the waste gas entering the thermodynamic circulation process has a temperature of 100 to 200° C.

4. The method as claimed in claim 3, wherein the waste gas entering the thermodynamic circulation process has a temperature of 140 to 200° C.

5. The method as claimed in claim 4, wherein the useful form of energy is either electrical or mechanical energy.

* * * * *